(12) United States Patent
Houlberg

(10) Patent No.: US 7,487,014 B1
(45) Date of Patent: Feb. 3, 2009

(54) INERTIAL NAVIGATION UNIT PROTOCOL CONVERTER

(75) Inventor: Christian Lauritz Houlberg, Ventura, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 327 days.

(21) Appl. No.: 11/499,983

(22) Filed: Jul. 31, 2006

(51) Int. Cl.
*G01C 23/00* (2006.01)
(52) U.S. Cl. .................. 701/3; 701/36; 710/8; 710/11; 710/62; 710/72
(58) Field of Classification Search ............. 701/3, 701/13–15, 24, 33, 35–36; 244/158.1; 710/8, 710/11, 62, 72
See application file for complete search history.

(56) References Cited

U.S. PATENT DOCUMENTS

| | | | | |
|---|---|---|---|---|
| 4,821,217 | A | * | 4/1989 | Jackson et al. .................. 701/3 |
| 5,377,109 | A | * | 12/1994 | Baker et al. .................... 701/14 |
| 6,072,571 | A | * | 6/2000 | Houlberg ............... 356/139.04 |
| 6,499,027 | B1 | * | 12/2002 | Weinberger .................... 707/4 |

* cited by examiner

*Primary Examiner*—Gertrude Arthur Jeanglaud
(74) *Attorney, Agent, or Firm*—David S. Kalmbaugh

(57) ABSTRACT

A protocol converter that translates the ARINC-429 protocol output of an Inertial Navigation System to the National Marine Electronics Association 0183 protocol. The protocol converter includes an ARINC-429 interface board with cable and software operating in a computer with at least one serial communications port. The software includes a protocol conversion program which is capable of outputting the NMEA-0183 protocol to as many as four serial communications ports simultaneously.

20 Claims, 10 Drawing Sheets

INERTIAL NAVIGATION UNIT PROTOCOL CONVERTER

BACKGROUND OF THE INVENTION

1. Field of the Invention

The present invention relates generally to the field of protocol converters. More specifically, the present invention relates to a protocol converter for use with an inertial navigation unit on the P-3 aircraft.

2. Description of the Prior Art

The Department of Homeland Security utilizes airborne surveillance operations to monitor illegal activities which have an impact on national security. These activities include drug trafficking, illegal immigration, and terrorist activities.

Many ride-along sensor units often deployed with a surveillance P-3 aircraft require the implementation the National Marine Electronics Association 0183 (NMEA-0183) serial navigation data format. Future proposed components for geospatial video recording and reproduction also require the ability to utilize this format. There is currently an immediate need to provide aircraft navigation data in real time to produce a coherent video data stream for situational awareness during the transport of sensor video to the ground for analysis. The NMEA-0183 protocol provides a low bandwidth, commonly utilized format that end users can easily make use of for situational awareness.

There are several ARINC-429 to NMEA-0183 protocol converters which are commercially available. None of these converters are specifically designed to utilize the wide variety of parameters available from the Litton LTN-92 Inertial Navigation System (INS), used on the P-3 aircraft, which is manufactured by Litton Industries, Incorporated. These protocol converters extract only the most commonly used parameters from the ARINC-429 protocol (such as time, position, ground speed and heading) and output only a small fixed set of NMEA-0183 sentences (such as RMB, RMC, GGA and GSA). None of the NMEA-0183 sentences provided by these protocol converters are capable of providing pointing information that is used to indicate the location of an object relative to the P-3 aircraft.

Accordingly there is a need for a protocol converter that generates a custom sentence which includes pointing information that is used to indicate the location of an object relative to the P-3 aircraft.

SUMMARY OF THE INVENTION

The invention relates to an Inertial Navigation Unit (INU) Protocol Converter that translates the ARINC-429 protocol output of a Litton LTN-92 Inertial Navigation System (INS) to the National Marine Electronics Association 0183 (NMEA-0813) protocol. The protocol converter comprises one commercially available ARINC-429 interface board with cable and software operating in a computer with at least one serial communications port and running the Microsoft Windows 2000 or Microsoft Windows XP operating system. The ARINC-429 interface board utilized in this invention is the CEI-520A-44 interface board manufactured by Condor Engineering, although any ARINC-429 interface board could be adapted for this use. The protocol conversion program software comprises two files (INU_Convert.exe, and INU_Convert.ini). INU_Convert.exe is the executable program that performs the protocol conversion. INU_Convert.ini is an initialization file used by the executable at startup to initialize its configuration.

The protocol conversion program is installed to start upon computer startup and appears as a small P-3 aircraft icon in the operating system's system tray. The user can expand this icon to view the status of the ARINC-429 and serial communications interfaces as well as change the configuration of the protocol conversion program. This protocol conversion program is capable of outputting the NMEA-0183 protocol to as many as four serial communications ports simultaneously. The protocol conversion program is also capable of outputting any combination of nine NMEA-0183 sentences, one of which is a custom sentence that contains aircraft position, orientation and pointing information to a waypoint, destination or target location entered by the user.

DETAILED DESCRIPTION OF A PREFERRED EMBODIMENT

Figures 1, 2:
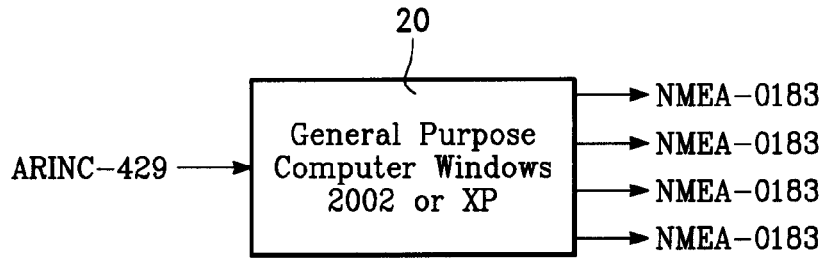
FIG. 1 illustrates a communications flow diagram for the inertial navigation unit protocol converter comprising the present invention.
FIG. 2 is a computer generated display of the ARINC-429 data and status and the status of the NMEA-0183 interface.

Referring to FIG. 1, the INU_Convert program is a protocol conversion program that translates the ARINC-429 avionics protocol to the National Marine Electronics Association 0183 (NMEA-0183) protocol. This program was developed to run on computers utilizing the Windows 2000 and Windows XP operating systems. This program is comprised of two files, the program executable file, "INU_Convert.exe", and the program initialization file, "INU_Convert.ini". The initialization file is a text file that contains data used to establish the initial communications ports and parameters used in the protocol conversion.

The INU_Convert program was developed for the CEI-520A-44 interface board manufactured by Condor Engineering. This interface board interfaces to the PCI bus of computer 20 (FIG. 1) and supports up to four input and four output ARINC-429 channels.

The board installation is accomplished utilizing software and following the instructions provided by the manufacturer, Condor Engineering. The installation program "setup.exe" for the board is located in a Setup\Disk1 folder on the CEI-x20-SW installation CD. During installation the interface board must be installed as device 0 which is the first available Condor Engineering device. No other settings are required for installation of the board. During startup the board is initialized to operate at a speed of 100 KHz which is ARINC-429 High Speed.

The following table shows the Litton LTN-92 Inertial Navigation Unit (INU) ARINC-429 Octal Labels that are monitored by the software, their definition and the NMEA-0183 sentences the data are used in.

TABLE I

| Octal Label | Definition | NMEA Sentence |
|---|---|---|
| 101 | GPS Horizontal Dilution of Precision (meters) | GGA, GSA |
| 102 | GPS Vertical Dilution of Precision (meters) | GSA |
| 116 | Cross Track Error (nautical miles) | RMB |
| 150 | UTC Time (hours, minutes & seconds - resolution 1 sec.) | RMC, GGA, GLL |
| 260 | UTC Date (day, month & year - resolution 1 day) | RMC |
| 310 | Present Position Latitude (degrees) | RMC, GGA, GLL |
| 311 | Present Position Longitude (degrees) | RMC, GGA, GLL |
| 312 | Ground Speed (knots) | RMC |
| 313 | Track Angle (degrees) | RMC |
| 314 | True Heading (degrees) | RMC, BOD |
| 320 | Magnetic Heading (degrees) | RMC |
| 324 | Pitch Angle (degrees - positive for nose up) | Not Supported |
| 325 | Roll Angle (degrees - positive for left wing up) | Not Supported |
| 351 | Distance to Destination (nautical miles) | RMB |
| 352 | Time to Destination (minutes) | RMB |
| 361 | Inertial Altitude (feet) | GGA |

The software is self starting upon computer startup. This is accomplished via a shortcut in the user's Startup folder. Upon startup the program shows itself as an icon in the user's System Tray. The icon appears as a P-3 flying over an ocean. The ocean's color provides an indication of the status of the operation of the protocol converter as set forth in Table II.

TABLE II

| Icon Ocean Color | Meaning |
|---|---|
| Solid Green | ARINC hardware initialized and Active ARINC input. |
| Alternating Green and Red | ARINC hardware initialized and No Active ARINC input. |
| Alternating Yellow and Green | ARINC hardware mismatch and Active ARINC input. |
| Alternating Yellow and Green | All serial COM ports are off and Active ARINC input. |
| Alternating Yellow and Green | No NMEA sentences selected and Active ARINC input. |
| Alternating Yellow and Red | ARINC hardware mismatch and No Active ARINC input. |
| Alternating Yellow and Red | All serial COM ports are off and No Active ARINC input. |
| Alternating Yellow and Red | No NMEA sentences selected and No Active ARINC input. |
| Solid Red | ARINC hardware initialization failed and No ARINC input. |

During normal operation a label "INU Protocol Converter" is displayed when the mouse pointer is placed over the icon on the System Tray. A double click of the left mouse button over the System Tray Icon opens the application and displays the status of the ARINC input data as well as the configuration and status of the communications ports used for the NMEA-0183 output. A single click of the right mouse button over the System Tray Icon provides the option of opening the application (same function as a left mouse button double click) or closing (terminating) the application.

When a condition other than normal operation exists the label on the System Tray Icon will change. Placing the mouse pointer over the icon when the color is other than green will display a description of the condition that led to the color change. This description corresponds to that shown in TABLE II.

Referring to FIG. 2, when the application is opened (as shown in FIG. 2), primary ARINC-429 data and status are displayed via an ARINC-429 DATA & STATUS display 29. In addition, the status of the NMEA-0183 interface is displayed via NMEA-0183 STATUS display 21. This provides the user with a more detailed view of the condition of the interfaces and the option of entering a destination or waypoint. It also provides the user with the ability to change the settings of the communications ports and sentences used in the NMEA-0183 interface.

If any of the displayed ARINC-429 data is inactive for 2 or more seconds the data is displayed as red text over a yellow background. If no data is being received the status is displayed as red text over a yellow background and there is an indication "No Data Updates".

If any of the communications ports fail initialization the status is displayed as red text over a yellow background and there is an indication "Failed".

Upon startup, the protocol conversion program scans the registry for communications ports and lists the communications ports found in the dropdown boxes under the label "Port" in the NMEA-0183 status display 21. Up to four communications ports can be operated simultaneously. When a communications port is selected a dropdown box for the port's baud rate becomes active within NMEA-0183 status display 21. This provides the user with the option of selecting a baud rate other than the standard 4800 baud. The port status within NMEA-0183 status display 21 is also displayed showing the condition of the interface. In accordance with the NMEA-0183 standard, there is no option to select any form of hardware or software handshaking of data between the application and any connected device.

The user can select any or all of the displayed NMEA-0183 sentences 23 for output. The four sentences used by most NMEA-0183 devices are show selected in FIG. 2. All active communications ports output the same set of selected sentences.

The NMEA-0183 protocol supports the sending of destination latitude and longitude as well as that of waypoints entered into the Inertial Navigation Unit. However, the data provided by the Litton LTN-92 INU via the ARINC-429 interface does not contain this information. An "Enable Destination (Waypoint 1) I/O" option 25 has been added to the user controls to provide some facility to pass on destination or waypoint information via the NMEA-0183 interface.

When this option is enabled the Destination Latitude, Longitude and Altitude input controls within a DISTINATION (WAYPOINT) INPUT display 27 appear, as well as the NMEA-0183 output controls to enable the WPL, BOD and CAP sentences of the displayed NMEA-0183 sentences 23 (FIG. 2).

The Destination Latitude and Longitude parameters within display 27 are entered by the user in the same form as that displayed for the ARINC-429 Present Position Latitude and Longitude of display 29 (degrees, minutes and seconds with a letter designation representing the hemisphere). Likewise, with the Destination Altitude which is entered in feet. As a result, the data provided by the ARINC-429 label 351 (Distance to Destination) and label 352 (Time to Destination) will be superseded by values computed from the present position and destination locations and the ground speed. In addition, the true and magnetic bearings to the destination are computed and provided for output via the appropriate NMEA-0183 sentence.

When this option is not enabled only the available ARINC-449 data will be used. A blank (null) field is sent for all NMEA-0183 data fields in which there are no corresponding ARINC-429 values or calculated data. An exception to this rule is for data fields containing satellite information. These data fields are simulated.

When the application is opened (FIG. 2) there are four control buttons available to the user. The OK Button 24 is used to minimize the application back to an icon on the System Tray. Any changes made to the communication port settings or selected NMEA-0183 sentences remain in effect. However, these settings or selected sentences are not saved. If the computer is shut down and restarted, the application is configured according to the last set of saved settings. The Cancel Button 26 is also used to minimize the application back to an icon on the System Tray. However, with this button, any changes made to the communication port settings or selected NMEA-0183 sentences are discarded. The application reverts back to the last set of saved settings.

The Save Button 28 is used to save any changes made to the communication port settings or selected NMEA-0183 sentences. All settings in effect at the time the save button 28 is pressed will be saved to the "INU_Convert.ini" file. The next time the application is started it will be configured in accordance with these settings.

The Close Button 30 is used to close or terminate the application. If any changes have been made to the application settings and not saved via the Save Button 28, a dialog window will appear which gives the user the option to save those settings. After the application is terminated it can be restarted by clicking the "INU_Convert" shortcut in the Startup Folder (Start\Programs\Startup).

The protocol conversion program is capable of outputting any combination of nine NMEA-0183 sentences, one of which is a custom sentence that contains aircraft position, orientation and pointing information to a waypoint, destination or target location entered by the user. The General Sentence Format for all NMEA-0183 sentences is the following format:

$(Sentence ID), (Field1), (Field2), (Field 3), . . . , (Field N)*(Checksum)(\r)(\n)

There are eight standard NMEA-0183 sentences and one custom sentence supported by the protocol conversion program. All sentences begin with a '$' character immediately follow by a five character sentence ID. Each sentence contains a series of ASCII data fields separated by a comma. An asterisk designates the end of the last data field and is followed by a two ASCII character checksum. The checksum is the hexadecimal ASCII representation of the exclusive OR of all character in the sentence between and not including the '$' and the '*'.

Following the checksum the sentence is terminated with a carriage return character and a line feed character. The maximum length of a sentence is 82 characters including the return and line feed characters. The NMEA-0183 sentences supported by this application are GPRMB, GPRMC, GPGGA, GPGLL, GPGSA, GPGSV, GPWPL, GPBOD and the custom sentence GPCAP.

The fields for the GPRMB NMEA-0183 sentence are as follows:

Field 1 Data Status where 'A'=OK and 'V'=Void or Warning (invalid or out of date).

Field 2 Cross Track Error in nautical miles (maximum value of 9.99 nautical miles).

Field 3 Direction to Correct Cross Track Error where 'L'=Left and 'R'=Right.

Field 4 Origin Waypoint ID represented by 5 ASCII characters. Origin ID is "ACFT" when Present Position Latitude and Longitude are valid.

Origin ID is " " when Present Position Latitude or Longitude are invalid.

Field 5 Destination Waypoint ID represented by 5 ASCII characters.
  Destination ID is "DEST" when a valid destination location has been entered.
  Destination ID is " " when a destination location has not been entered.

Field 6 Destination Latitude is in degrees and minutes to the 0.0001 minute.
  This field contains no characters when a destination location has not been entered.

Field 7 Destination Latitude Hemisphere where 'N'=North and 'S'=South.
  This field contains no characters when a destination location has not been entered.

Field 8 Destination Longitude is in degrees and minutes to the 0.0001 minute.
  This field contains no characters when a destination location has not been entered.

Field 9 Destination Longitude Hemisphere where 'E'=East and 'W'=West.

Field 10 Range to Destination in nautical miles (maximum value of 999.9 nautical miles).
  Range is computed from Present Position and Destination locations.
  This data is obtained from ARINC-429 label 351 when no valid Present Position is available or a destination has not been entered.

Field 11 True Bearing to Destination is in degrees to the tenth of a degree.
  This field contains no characters when a destination location has not been entered.

Field 12 Velocity towards destination is in knots to a tenth of a knot.
  Velocity is computed from Distance to Destination (ARINC-429 label 351) and Time to Destination (ARINC-429 label 352). When a destination location has been entered the velocity is computed from the calculated Distance to Destination and the Ground Speed component in the direction of the destination.

Field 13 Arrival Alarm where 'A'=Arrived and 'V'=Not Arrived.
  Arrival Alarm='A' when the Distance to Destination is 1 nautical mile or less.

The fields for the GPRMC NMEA-0183 sentence are as follows:

Field 1 UTC Time is in hours, minutes and seconds with a resolution of one second.
  This field contains six ASCII characters representing hours, minutes and seconds.

Field 2 Data Status where 'A'=Active and 'V'=Void (no active data).

Field 3 Present Position Latitude is in degrees and minutes to the 0.0001 minute.
  This data is obtained from ARINC-429 label 310.

Field 4 Present Position Latitude Hemisphere where 'N'=North and 'S'=South.

Field 5 Present Position Longitude is in degrees and minutes to the 0.0001 minute.
  This data is obtained from ARINC-429 label 311.

Field 6 Present Position Longitude Hemisphere where 'E'=East and 'W'=West.

Field 7 Speed over Ground in knots to a tenth of a knot.
  This data is obtained from ARINC-429 label 312.

Field 8 Track Angle is in degrees True to a tenth of a degree.
  This data is obtained from ARINC-429 label 313.

Field 9 UTC Date is in day of month, month and year represented by six ASCII characters.
  This date is valid from Jan. 1, 1970 through 2069.

Field 10 Magnetic Variation is in degrees to a tenth of a degree.
  Magnetic Variation is computed from True Heading (ARINC-429 label 314) and Magnetic Heading (ARINC-429 label 320) when both are valid.
  Magnetic Variation is computed from lookup tables using Present Position Latitude, Present Position Longitude, Inertial Altitude (ARINC-429 label 361) and UTC Date when they are valid and either True Heading or Magnetic Heading is not.
  Magnetic Variation is set to zero when none of the above conditions are met.

The fields for the GPGGA NMEA-0183 sentence are as follows:

Field 1 UTC Time is in hours, minutes and seconds with a resolution of one second.
  This field contains six ASCII characters representing hours, minutes and seconds.

Field 2 Present Position Latitude is in degrees and minutes to the 0.0001 minute.
  This data is obtained from ARINC-429 label 310.

Field 3 Present Position Latitude Hemisphere where 'N'=North and 'S'=South.

Field 4 Present Position Longitude is in degrees and minutes to the 0.0001 minute.
  This data is obtained from ARINC-429 label 311.

Field 5 Present Position Longitude Hemisphere where 'E'=East and 'W'=West.

Field 6 Fix Quality is initially set to 8 (Simulation) and when data is active set to 1 (SPS).

Field 7 Number of satellites being tracked is always set to 8 (simulated requirement).

Field 8 Horizontal Dilution of Precision (HDOP) is obtained from ARINC-429 label 101.
  This value is set to zero when label 101 is inactive.

Field 9 Altitude is in meters to a tenth of a meter (ARINC-429 label 361).

Field 10 Altitude unit is set to 'M' representing meters.

Field 11 Height of Geoid is in meters to a tenth of a meter.
  This value is computed from a table and the Present Position Latitude and Longitude.

Field 12 This is an empty field (no characters) since DGPS is not used or being indicated.

Field 13 This is an empty field (no characters) since DGPS is not used or being indicated.

The fields for the GPGLL NMEA-0183 sentence are as follows:

Field 1 Present Position Latitude is in degrees and minutes to the 0.0001 minute.
  This data is obtained from ARINC-429 label 310.

Field 2 Present Position Latitude Hemisphere where 'N'=North and 'S'=South.

Field 3 Present Position Longitude is in degrees and minutes to the 0.0001 minute.
  This data is obtained from ARINC-429 label 311.

Field 4 Present Position Longitude Hemisphere where 'E'=East and 'W'=West.

Field 5 UTC Time is in hours, minutes and seconds with a resolution of one second.
  This field contains six ASCII characters representing hours, minutes and seconds.

Field 6 Data Status where 'A'=Active and 'V'=Void (no active data).

The fields for the GPGSA NMEA-0183 sentence are as follows:

Field 1 Auto Selection of 2D or 3D fix is always set to 'A' to indicate Auto (simulated).

Field 2 3D Fix is always set to '3' to indicate a 3D fix (simulated).

Field 3 Always set to "01" to indicate a satellite with a PRN of 1 (simulated).

Field 4 Always set to "02" to indicate a satellite with a PRN of 2 (simulated).

Field 5 Always set to "03" to indicate a satellite with a PRN of 3 (simulated).

Field 6 Always set to "04" to indicate a satellite with a PRN of 4 (simulated).

Field 7 Always set to "05" to indicate a satellite with a PRN of 5 (simulated).

Field 8 Always set to "06" to indicate a satellite with a PRN of 6 (simulated).

Field 9 Always set to "07" to indicate a satellite with a PRN of 7 (simulated).

Field 10 Always set to "08" to indicate a satellite with a PRN of 8 (simulated).

Field 11 Dilution of Precision is calculated from HDOP and Vertical Dilution of Precision.

Field 12 Horizontal Dilution of Precision is obtained from ARINC-429 label 101.
  This value is set to zero when label 101 is inactive.

Field 13 Vertical Dilution of Precision (VDOP) is obtained from ARINC-429 label 102.
  This value is set to zero when label 102 is inactive.

The fields for the GPGSV NMEA-0183 sentence are as follows:

Field 1 Number of Sentences for Full Data is always set to '2' (4 satellites per sentence).

Field 2 Sentence Number will be either a '1' (satellites 01-04) or a '2' (satellites 05-08).

Field 3 Number of Satellites in View will always be '8' (simulated).

Field 4 Satellite PRN Number set to "01" for sentence 1 or "05" for sentence 2 (simulated).

Field 5 Satellite Elevation in degrees set to "30" for all satellites (simulated).

Field 6 Satellite Azimuth in degrees set to "45" or "225" for sentence 1 or 2 respectively.

Field 7 Satellite SNR set to "30" or "34" for sentence 1 or 2 respectively (simulated).

Field 8 Satellite PRN Number set to "02" for sentence 1 or "06" for sentence 2 (simulated).

Field 9 Satellite Elevation in degrees set to "30" for all satellites (simulated).

Field 10 Satellite Azimuth in degrees set to "90" or "270" for sentence 1 or 2 respectively.

Field 11 Satellite SNR set to "31" or "35" for sentence 1 or 2 respectively (simulated).

Field 12 Satellite PRN Number set to "03" for sentence 1 or "07" for sentence 2 (simulated).

Field 13 Satellite Elevation in degrees set to "30" for all satellites (simulated).

Field 14 Satellite Azimuth in degrees set to "135" or "315" for sentence 1 or 2 respectively.

Field 15 Satellite SNR set to "32" or "36" for sentence 1 or 2 respectively (simulated).

Field 16 Satellite PRN Number set to "04" for sentence 1 or "08" for sentence 2 (simulated).

Field 17 Satellite Elevation in degrees set to "30" for all satellites (simulated).

Field 18 Satellite Azimuth in degrees set to "180" or "360" for sentence 1 or 2 respectively.

Field 19 Satellite SNR set to "33" or "37" for sentence 1 or 2 respectively (simulated).

The fields for the GPWPL NMEA-0183 sentence are set forth below. This sentence requires the "Enable Destination" box (FIG. 2) to be checked and the entry of a destination. If this condition is not met this sentence will not be sent.

Field 1 Waypoint Latitude is in degrees and minutes to the 0.0001 minute. This data is obtained from the Destination Latitude dialog edit box entry.

Field 2 Waypoint Latitude Hemisphere where 'N'=North and 'S'=South.

Field 3 Waypoint Longitude is in degrees and minutes to the 0.0001 minute.

This data is obtained from the Destination Longitude dialog edit box entry.

Field 4 Waypoint Longitude Hemisphere where 'E'=East and 'W'=West.

Field 5 Waypoint Name is always set to "DEST" indicating destination.

The fields for the GPBOD NMEA-0183 sentence are set forth below. This sentence requires the "Enable Destination" box (FIG. 2) to be checked and the entry of a destination. If this condition is not met this sentence will not be sent.

Field 1 Bearing True from Start to Destination in degrees.

Field 2 True Bearing indicator is always set to 'T'.

Field 3 Bearing Magnetic from Start to Destination is in degrees.

Field 4 Magnetic Bearing indicator is always set to 'M'.

Field 5 Destination Waypoint ID is always set to "DEST".

Field 6 Origin Waypoint ID is always set to "ACFT".

The fields for the GPCAP NMEA-0183 sentence are set forth below. This sentence requires the "Enable Destination" box to be checked, the entry of a destination and active ARINC-429 input parameters required for the calculation of Pointing Azimuth and Pointing Elevation. If these conditions are not met this sentence will not be sent.

Field 1 Present Position Latitude is in degrees with a resolution of 0.00001 degrees (3 feet). This data is obtained from ARINC-429 label 310. The sign of the latitude confers the hemisphere where a '+'=Northern Hemisphere and a '−'=Southern Hemisphere.

Field 2 Present Position Longitude is in degrees with a resolution of 0.00001 degrees (3 feet).

This data is obtained from ARINC-429 label 311. The sign of the latitude confers the hemisphere where a '+'=Eastern Hemisphere and a '−'=Western Hemisphere.

Field 3 Altitude is in feet with a resolution of 1 foot (ARINC-429 label 361).

Field 4 Roll is in degrees to the one thousandth of a degree (ARINC-429 label 325).

Field 5 Pitch is in degrees to the one thousandth of a degree (ARINC-429 label 324).

Field 6 True Heading is in degrees to the one thousandth of a degree (ARINC-429 label 314).

Field 7 Pointing Azimuth (calculated) is in degrees to the one thousandth of a degree.

Field 8 Pointing Elevation (calculated) is in degrees to the one thousandth of a degree.

The following sentence is a sample GPCAP sentence:

$GPCAP,+34.11110,−119.11060,123456,+020.001,−10.001,123.456, +012.001,−25.001*52RL

Where: "RL" refers to the Return and Linefeed characters.

The CAP (computer aided pointing) sentence provides a means whereby values in the sentence allow certain equipment receiving the sentence to point to a destination.

Figures 3, 4:
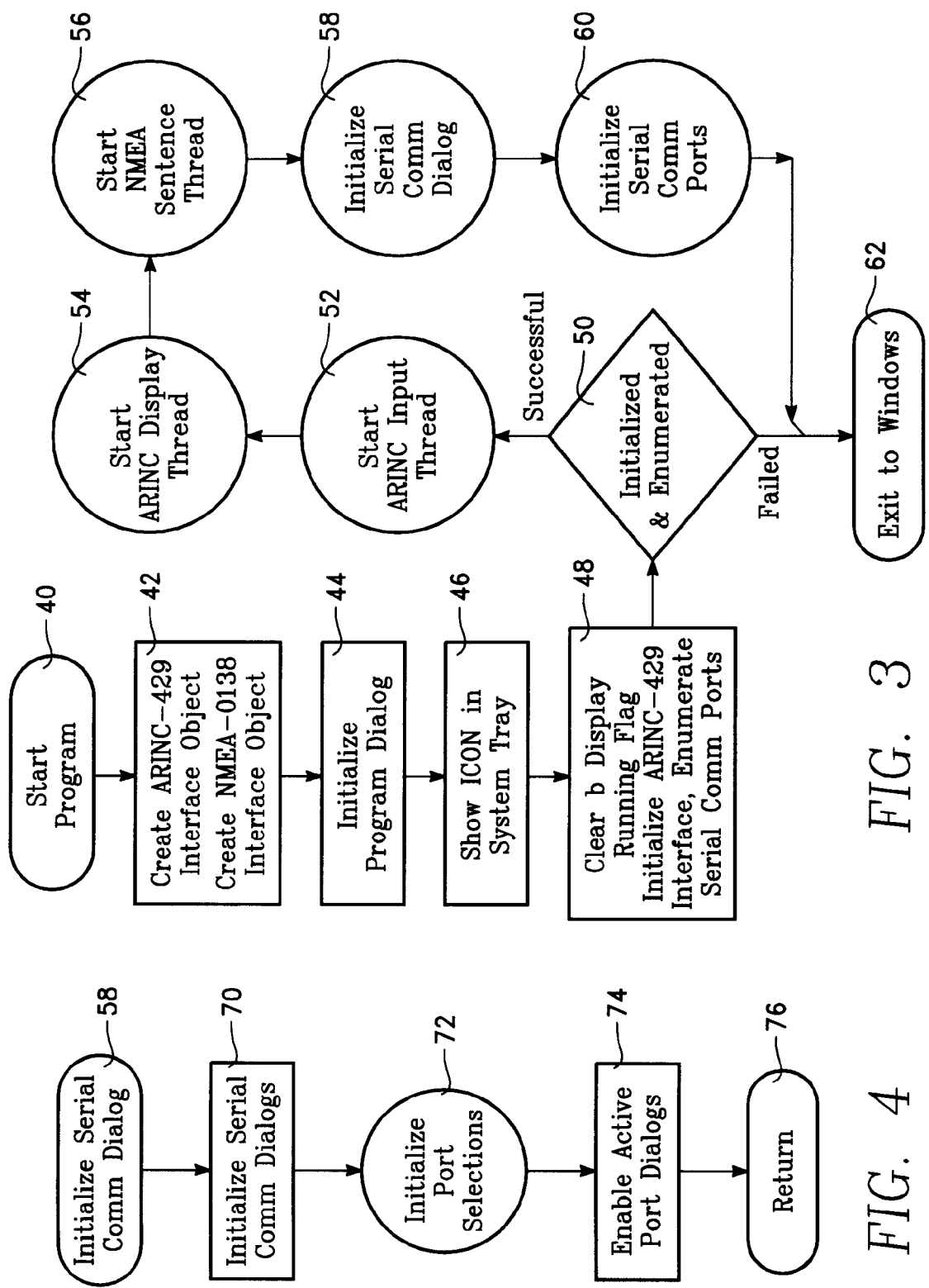
FIG. 3 is the start program dialog routine for the protocol conversion program used with the inertial navigation unit protocol converter of FIG. 1.
FIG. 4 is the InitializeSerialCommDialog routine for the protocol conversion program used with the inertial navigation unit protocol converter of FIG. 1.

Referring to FIG. 3, there is a flow chart for the Start Program routine 40 of protocol conversion program for translating the ARINC-429 avionics protocol to the National Marine Electronics Association 0183 (NMEA-0183) protocol which comprises an embodiment of the present invention. The software program is an object orientated program written in C++. Program step 42 creates two objects: (1) an ARINC-429 interface and (2) a NMEA-0183 interface which allows the software to call the threads within the two objects. Program step 44 initializes the program dialog which is the display illustrated in FIG. 2. Program step 46 shows the P-3 aircraft icon in the system tray. The system tray is located in the lower right corner of the basic window in the windows operating system program. Program step 48 clears a display running flag to indicate that the display is not running. The ARINC-429 interface is also initialized and the serial comm ports (four NMEA-0183 comm ports, FIG. 1) are enumerated. The program checks for available comm ports in computer 20 during program step 48. Program step 50 checks the initialization process and enumeration process to determine if each process was successful or a failure occurred.

When the initialization process and enumeration process are successful, the program proceeds to program step 52. When the initialization process and enumeration process fail, the program proceeds to program step 62, exiting to windows.

Program step 52 starts the ArincInput thread. A thread is program that runs in the background in the Windows operating system allowing other functions to be performed by the software while the thread is running. Program step 54 starts the ArincDisplay thread, and program step 56 starts the NmeaSentence thread which creates or sets up the NMEA-0183 sentences comprising the NMEA-0183 protocol. Program step 58 initializes the communications dialog. Program step 60 initializes the serial comm ports of computer 20 and the software then exits to Windows (program step 62).

The ArincInput, ArincDisplay and NmeaSentence threads perform the data processing and manipulation functions within the program.

Referring to FIGS. 1, 2, 4, FIG. 4 is the flow chart for the InitializeSerialCommDialog routine (program step 58, FIG. 3) of the protocol conversion program. Program step 70 initializes the dialog boxes available to the user, which are located in NMEA-0183 STATUS display 21 under the heading "PORT". The "BAUD RATE" within display 21 is also initialized.

Program step 72 initializes the port selections which results in the program reading an initialization file. Program step 74 enables active port dialogs. In FIG. 2, com port 1 is enabled, the port block below com port 1 is also enabled and the other blocks under PORT within NMEA-0183 STATUS display 21 are not enabled. This allows a user to manipulate two of the four PORT blocks within NMEA-0183 STATUS display 21. If a second comm port is selected a third port block will be enabled. Selecting a third comm port will result in all port blocks being enabled.

Figure 5:
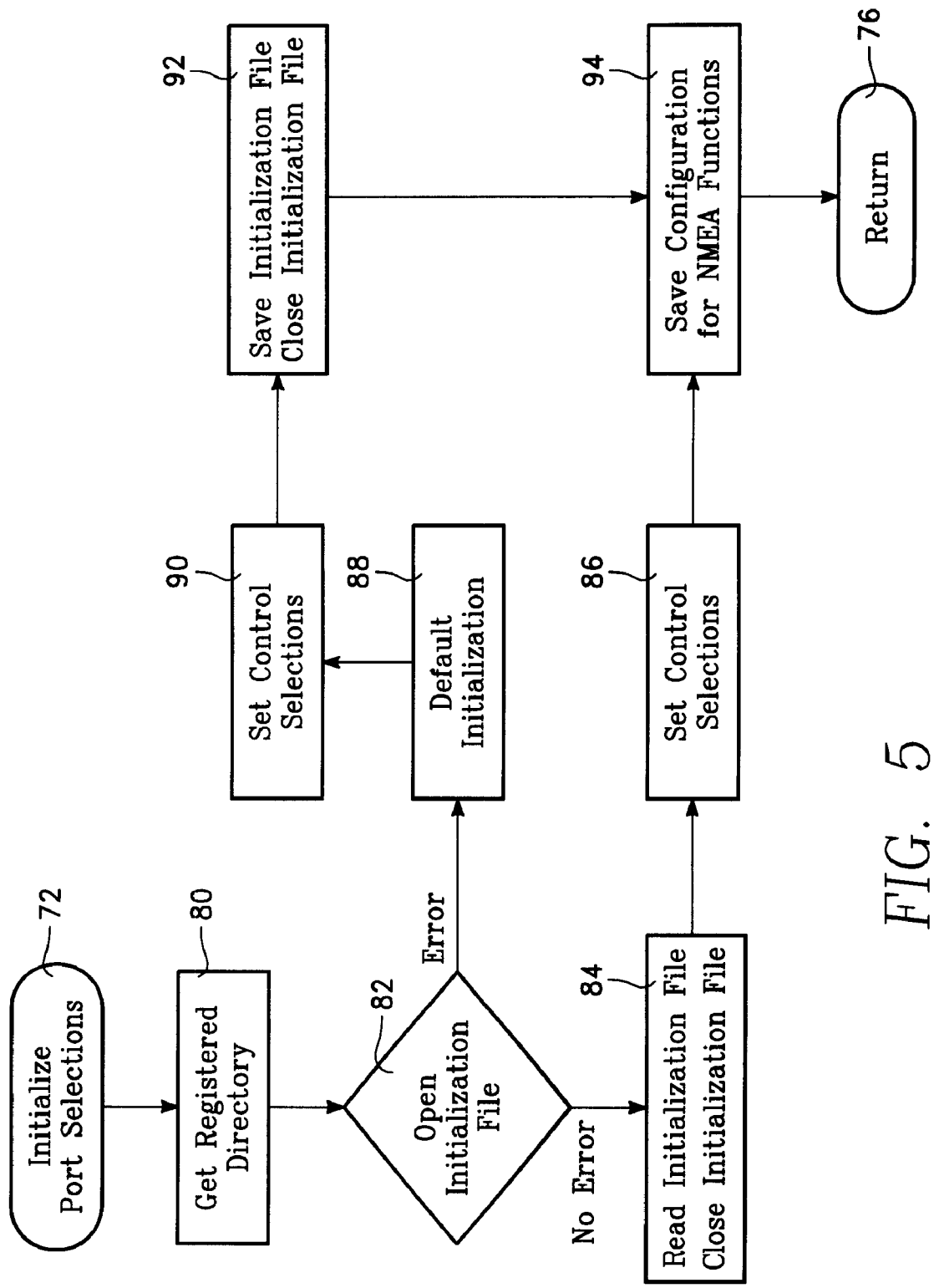
FIG. 5 is the InitializePortSelections routine for the protocol conversion program used with the inertial navigation unit protocol converter of FIG. 1.
Figure 6:
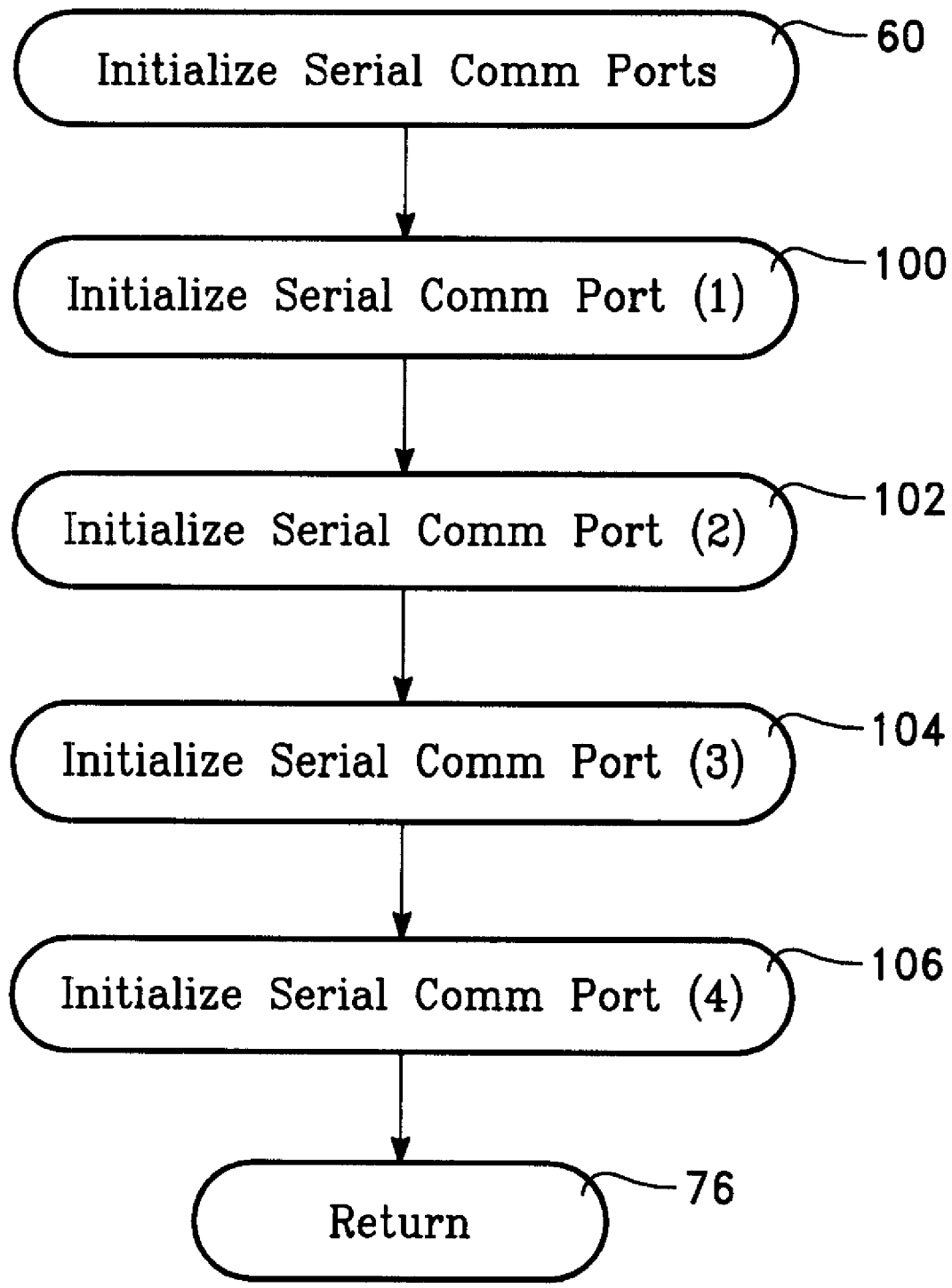
FIG. 6 is the InitializeSerialCommPorts routine for the protocol conversion program used with the inertial navigation unit protocol converter of FIG. 1.

Referring to FIGS. 1, 2 and 5, the program enters the InitializePortSelections routine (program step 72) which requires the software to open the initialization file. During program step 80, the program gets the registered directory which allows the program to locate the initialization file. When there is no error, the program opens the initialization file (program step 82), reads the data in the initialization file and closes the initialization file (program step 84). The program then sets the control selections listed in the initialization file (program step 86). The configuration obtained from the initialization file is saved by the program to allow the NMEA functions to be utilized and the program to operate (program step 94).

The program also has default initialization (program step 88) which can be used by the program in the event an error occurs when the program opens the initialization file. The default initialization, which is a backup to the initialization file, enables only one com port. Program step 90 sets the control selections to the default initialization. The default initialization to the initialization file is saved and closed (program step 92). The configuration obtained is saved by the program to allow the NMEA functions to be utilized and the program to operate (program step 96).

Figure 7:
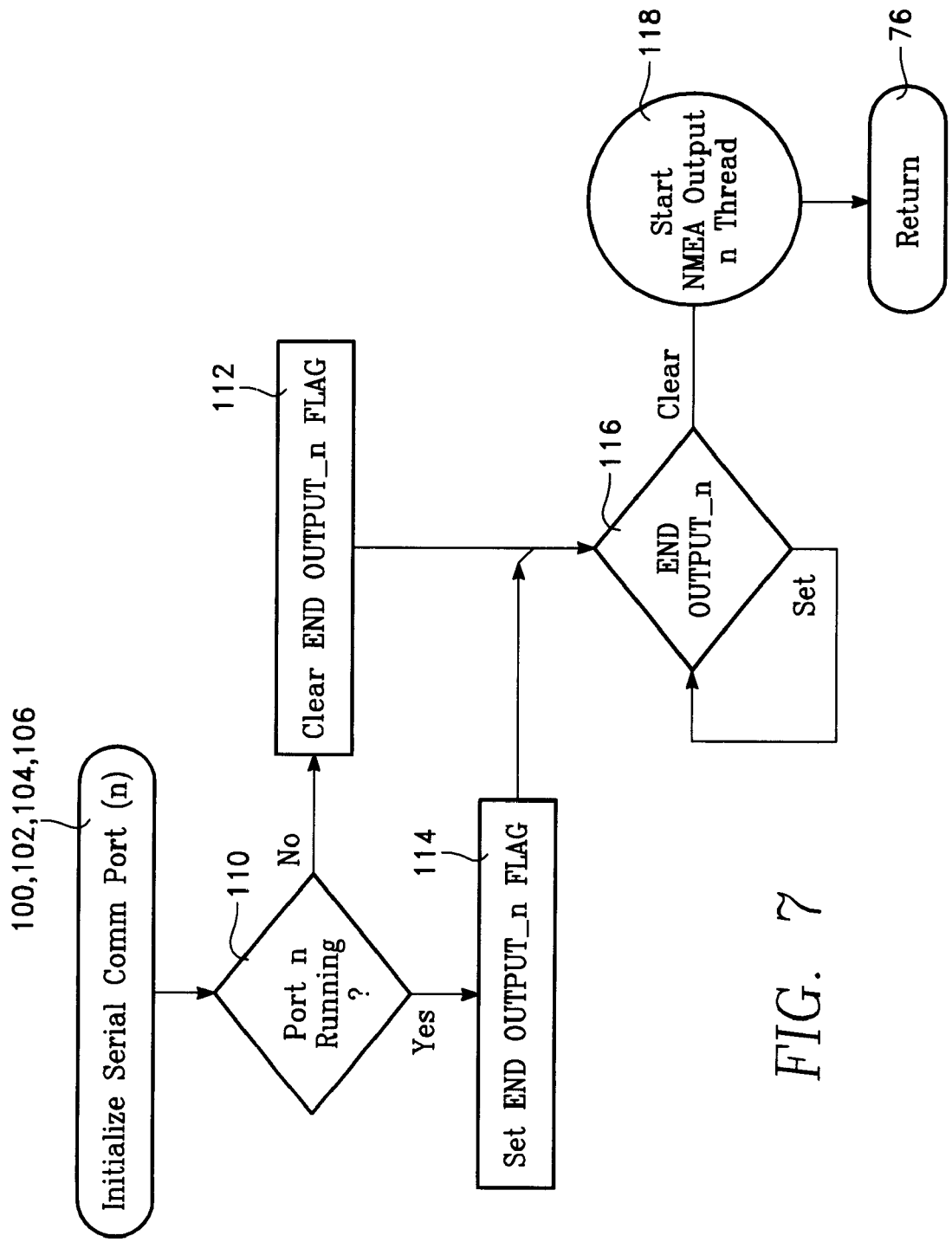
FIG. 7 is the InitializeSerialCommPort(n) routine for the protocol conversion program used with the inertial navigation unit protocol converter of FIG. 1.
Figure 8:
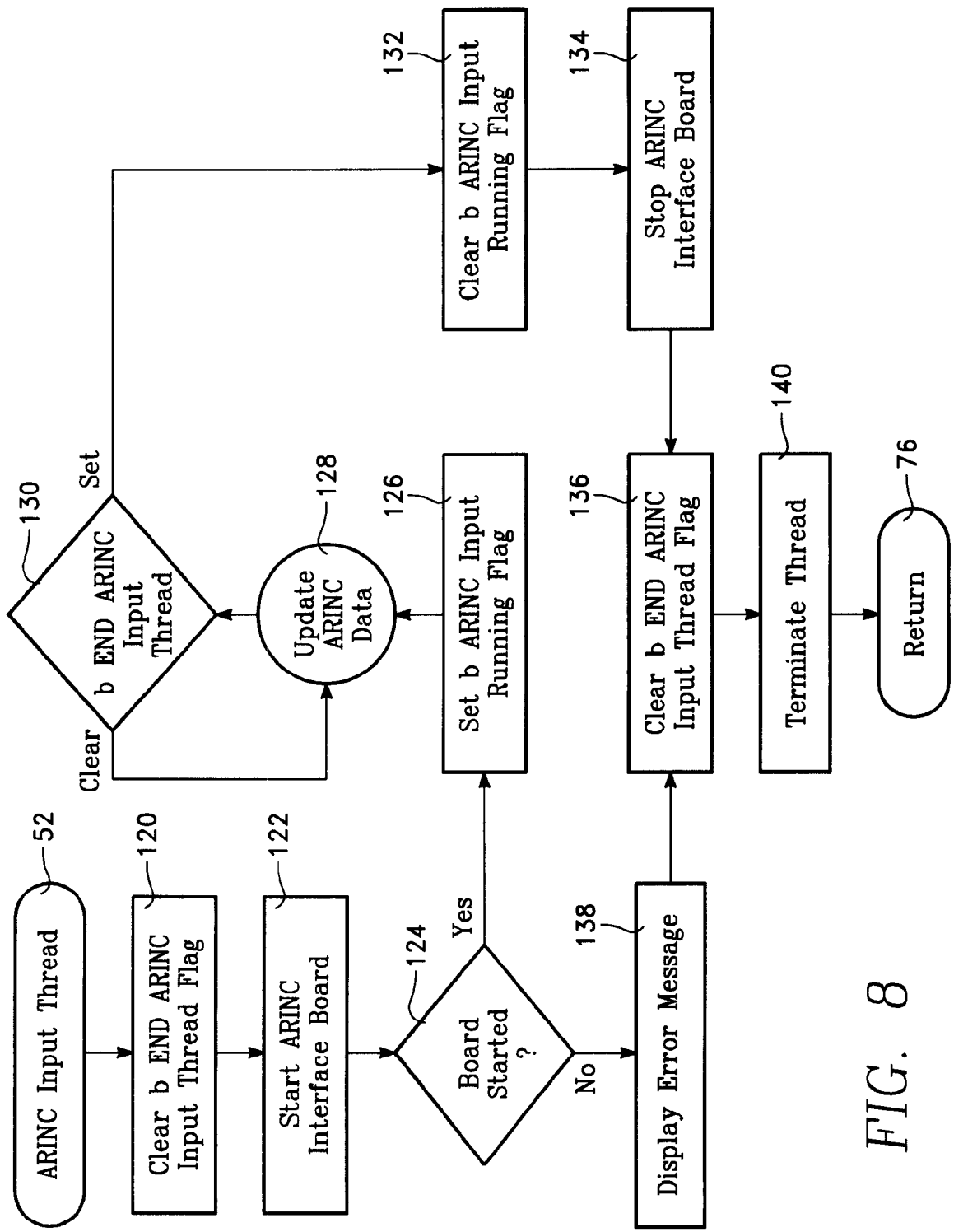
FIG. 8 is the ArincInput Thread routine for the protocol conversion program used with the inertial navigation unit protocol converter of FIG. 1.
Figure 9:
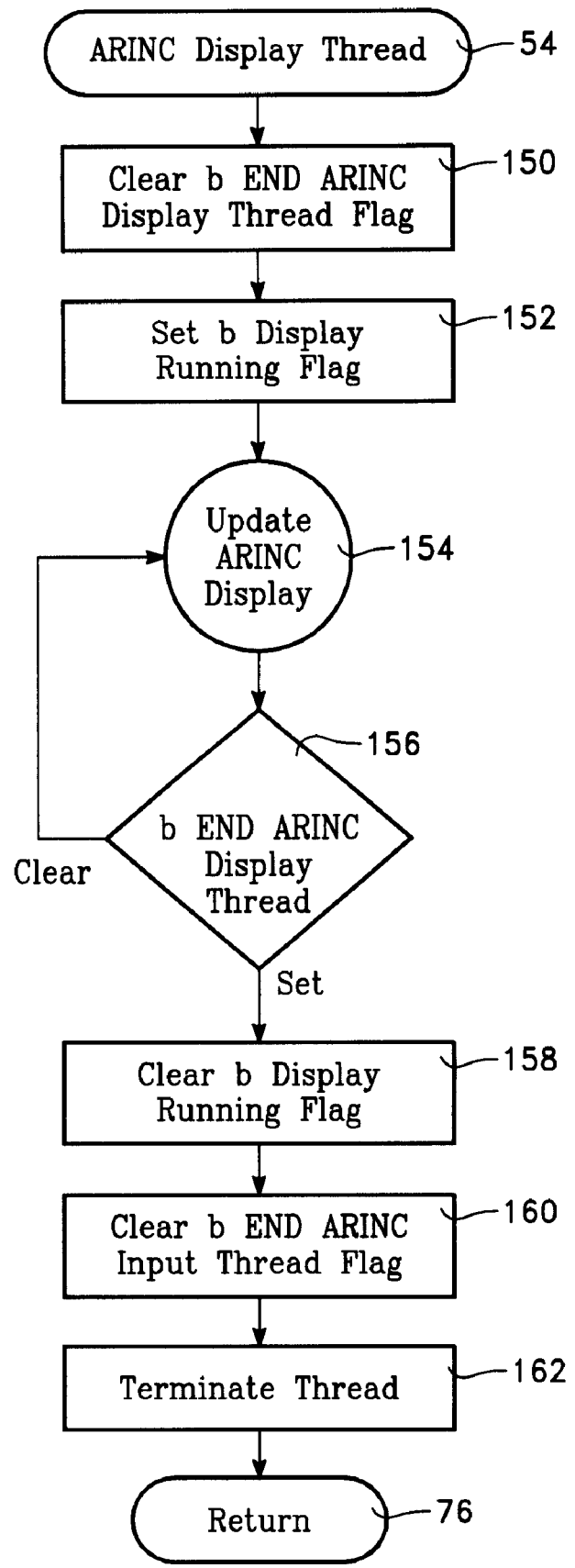
FIG. 9 is the ArincDisplay routine for the protocol conversion program used with the inertial navigation unit protocol converter of FIG. 1.
Figure 10:
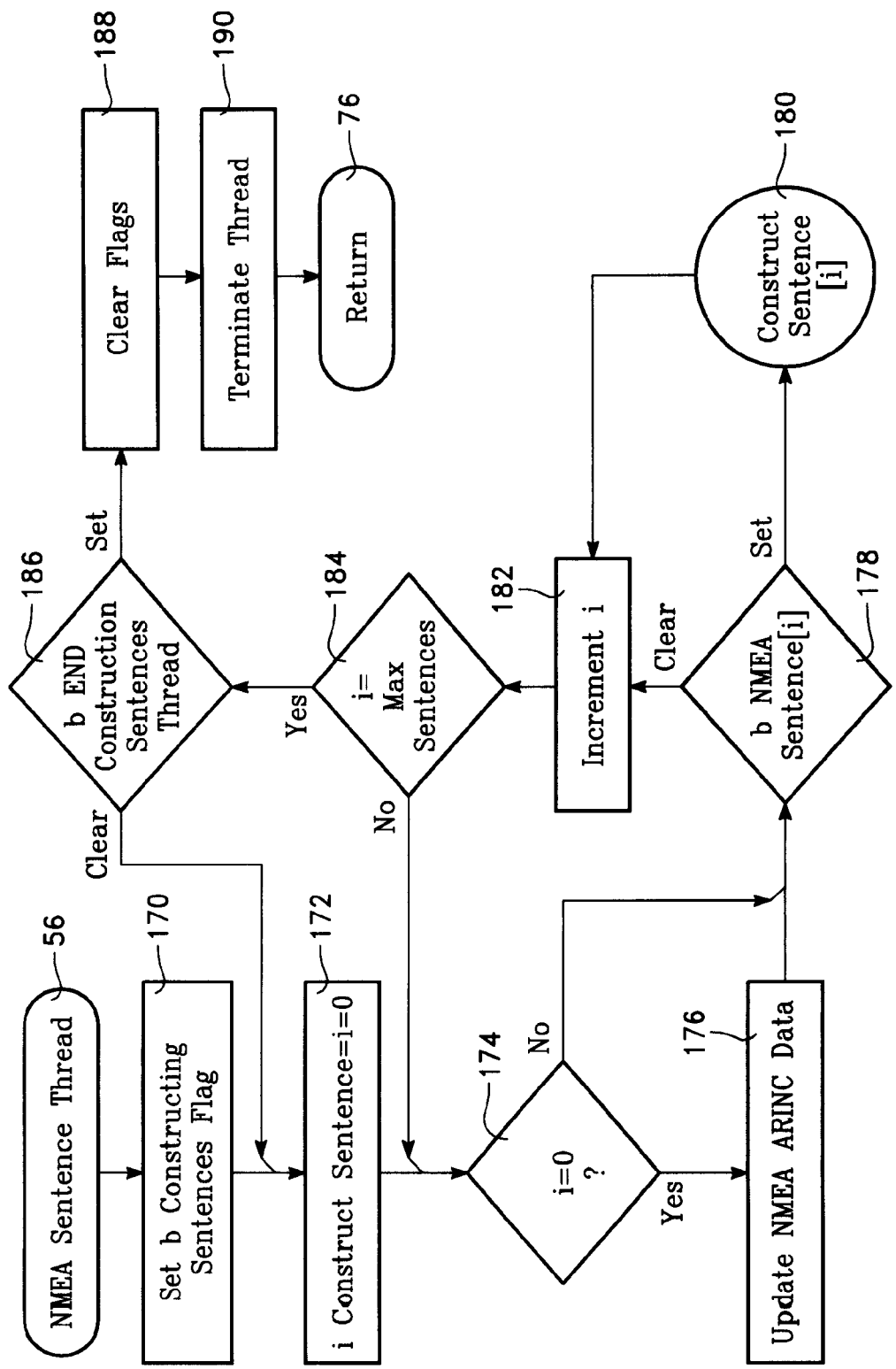
FIG. 10 is the NmeaSentence Thread routine for the protocol conversion program used with the inertial navigation unit protocol converter of FIG. 1.

Referring to FIGS. 1, 2, 6 and 7, program step 60 enters the InitializeSerialCommPorts routine. The four comm ports in the protocol conversion program software are initialized (program steps 100, 102, 104, 106). The four ports are the NMEA-0183 ports of computer 20 which are depicted in FIG. 1. FIG. 7 illustrates the initialization routine for each of the four serial ports.

Program step 110 determines if the port running. If the port is running an End Output Flag is set indicating the presence of an output thread (program step 110). Program step 116 is a decision step which runs until the output thread for the port is ended. When the thread detects the End Output Flag is set, the thread terminates itself and clears the End Output Flag. The NmeaOutput thread is started and initialized to the correct settings (program step 118). If the port is not running then the End Output Flag is cleared (program step 112), the flag is tested to determine that it is clear (program step 116), and the NmeaOutput thread is started and initialized to the correct settings (program step 118).

Referring to FIGS. 1, 2, 3 and 8, program step 52 enters the ArincInput Thread routine 52. Program step 120 clears an End ARINC Input Thread Flag which when cleared prevents the ArincInput Thread routine from exiting. Program step 122 starts the ARINC-429 interface board within computer 20. Program step 124 determines if the ARINC-429 interface board has been started and if the answer is "Yes" then an ARINC Input Running Flag is set (program step 126). Program step 128 reads the ARINC data from the ARINC-429 interface board and a test is performed to determine if the ArincInput Thread should be terminated (program step 130). The ArincInput Thread continues to update the ARINC data until the End ARINC Input Thread Flag is set. The ARINC Input Running Flag is then cleared (program step 132), which terminates the ArincInput Thread. Program step 134 stops the ARINC-429 interface board within computer 20, program step 136 clears the End ARINC Input Thread Flag 136 and program step 140 terminates the ArincInput Thread routine. If the ARINC-429 interface board within computer 20 does not start an error message is displayed (program step 138).

When the user clicks the CLOSE button 30, the End ARINC Input Thread Flag is set exiting the loop formed by program step 128 and 130. Closing the program is the only means by which the user can terminate the thread, i.e. by clicking the CLOSE button 30. The Update ARINC data function (program step 128) reads the data from the ARINC-429 Interface board within computer 20 and then stores the ARINC data in an array. The data is not in the correct form to transmit over the NMEA interface or bus. In addition, there is need to generate additional data not supplied by the ARINC-429 protocol.

Program step 128 reads the data on the ARINC-429 interface board and also calculates additional data required by the NMEA-0183 protocol which is not read from the ARINC-429 interface board. Data that is not available such as satellite numbers are simulated during program step 128. The data supplied by the ARINC-429 interface is provided as a 32 bit binary value. The data is then set in a form such that the NMEA Sentence Thread can create the nine NMEA sentences which are the GPRMB, GPRMC, GPGGA, GPGLL, GPGSA, GPGSV, GPWPL, GPBOD sentences and the custom sentence GPCAP.

For example, program step 128 looks for the ARINC-429 data which is used to generate the RMB sentence. Data status is established which is a component of the RMB sentence. Origin and Destination, which are alpha numeric labels for the NMEA sentences, are set up with origin being established as the P-3 aircraft. Pointing angles are computed and there is a check made to see if there is a track angle for computing cross track error.

Similarly, the data is set up for the RMC sentence. The RMC sentence consist of true heading, magnetic heading, latitude and longitude. GPS data is simulated by program step 128.

Referring to FIGS. 1, 2, 3 and 9, program step 52 enters the ArincDisplayThread routine 54, which allows the user to view the display of FIG. 2. The ArincDisplayThread routine 54 also allows the user to access the Save button 28, OK button 24, Close button 30 and the Cancel button 26. Program step 150 clears an End ARINC Display Thread Flag. Program step 152 sets the Display Running Flag which indicates that the Arincdisplay thread is running. Program step 154 updates the ARINC display which updates the dialogs being presented by the display of FIG. 2 in real time. Program step 156 tests to see if the End ARINC Display Thread Flag has been set. If the flag is not set, then the program loops and continuously updates the display of FIG. 2 in real time.

There is also a test made to see if the display of FIG. 2 is displayed on the computer screen which allows the user to view the display. This requires the user to double click the P-3 aircraft icon in the operating system's system tray. If the Icon is not double clicked the display of FIG. 2 will not be shown or updated. Only the P-3 aircraft icon is updated.

When the operator engages the close button 30 the End ARINC Display Flag is set and the Display Running Flag is cleared (program step 158). Program step 160 clears the End ARINC Input Thread Flag and program step 54 terminates the thread.

Referring to FIGS. 1, 2, 3 and 10, program step 56 enters the NmeaSentenceThread routine. Program step 170 sets a Constructing Sentences Flag to indicate the NMEA sentences are being constructed. An index i is initialized to zero (program step 172). The index i increments through the nine NMEA-0183 sentences that are provided by computer 20 starting with sentence zero (program step 174). The index is tested (program step 174) and if zero program step 176 updates the NMEA ARINC data, during which a snap shot is taken of the data in the ARINC data array. The data in the ARINC data array is copied into a variable.

When a NMEA Sentence Flag (program step 178) is checked in display 23 the NMEA sentence from program step 180 is constructed. In FIG. 2, the sentences RMB, RMC, GGA and GSA are checked in the NMEA-0183 sentences display 23 and these sentences will be output by computer 20.

When a sentence in display 23 is not checked then the software proceeds directly to program step 182 incrementing the index. When i equals the maximum number of sentences which is nine the software proceeds from program step 184 to program step 186. Program step 186 tests the Construct Sentences Thread Flag which is set when the user engages the close button 30 on the display of FIG. 2 and ends the thread. Flags are cleared (program step 188), and the thread is terminated (program step 190).

Referring to FIGS. 1, 2, 7 and 11, program step 118 starts the NmeaOutputThread routine which is enter through the flow chart of FIG. 7. Program step 200 determines whether a particular port has been selected, In FIG. 2, the Port COM1 has been selected within NMEA-0183 STATUS display 21. When the port is not selected the Clear End Output Flag is set (program step 222) and the NmeaOutputThread routine is terminated.

When the port is selected, the software proceeds to program step 202 opening the selected port. A test is then performed to see if the port is open (program step 204). If the answer is "Yes", the port status is set to running (program step 206) which indicates that the NmeaOutputThread routine is operational. Program step 208 sets up a sentence index i which is initialized to zero. This index is used to output the sentences previously constructed in program step 180 of the NMEA Sentence Thread routine.

The sentences selected in the displayed NMEA-0183 sentences 23 for output are output by the software in the loop formed by program steps 210, 212, 214, 216 and 218. Program step 210 tests to see if the NMEA sentence was selected, and program step 212 captures the NMEA sentence for output when the sentence is selected. The reason for capturing the NMEA sentence is to insure that the values or parameters within the sentence to be output are not changing, since the NMEA sentence thread routine is continuously reconstructing the NMEA sentences.

Program step 214 outputs the sentence captured by program step 212. Program step 218 increments the sentence index and program step 218 tests to see if the maximum number of NMEA sentences checked have been reached. When the answer is "Yes" a check is made to see End Output Flag is set (program step 220). If the End Output Flag is set, the End Output Flag is cleared (program step 222), and the NmeaOutputThread routine is terminated.

Figure 11:
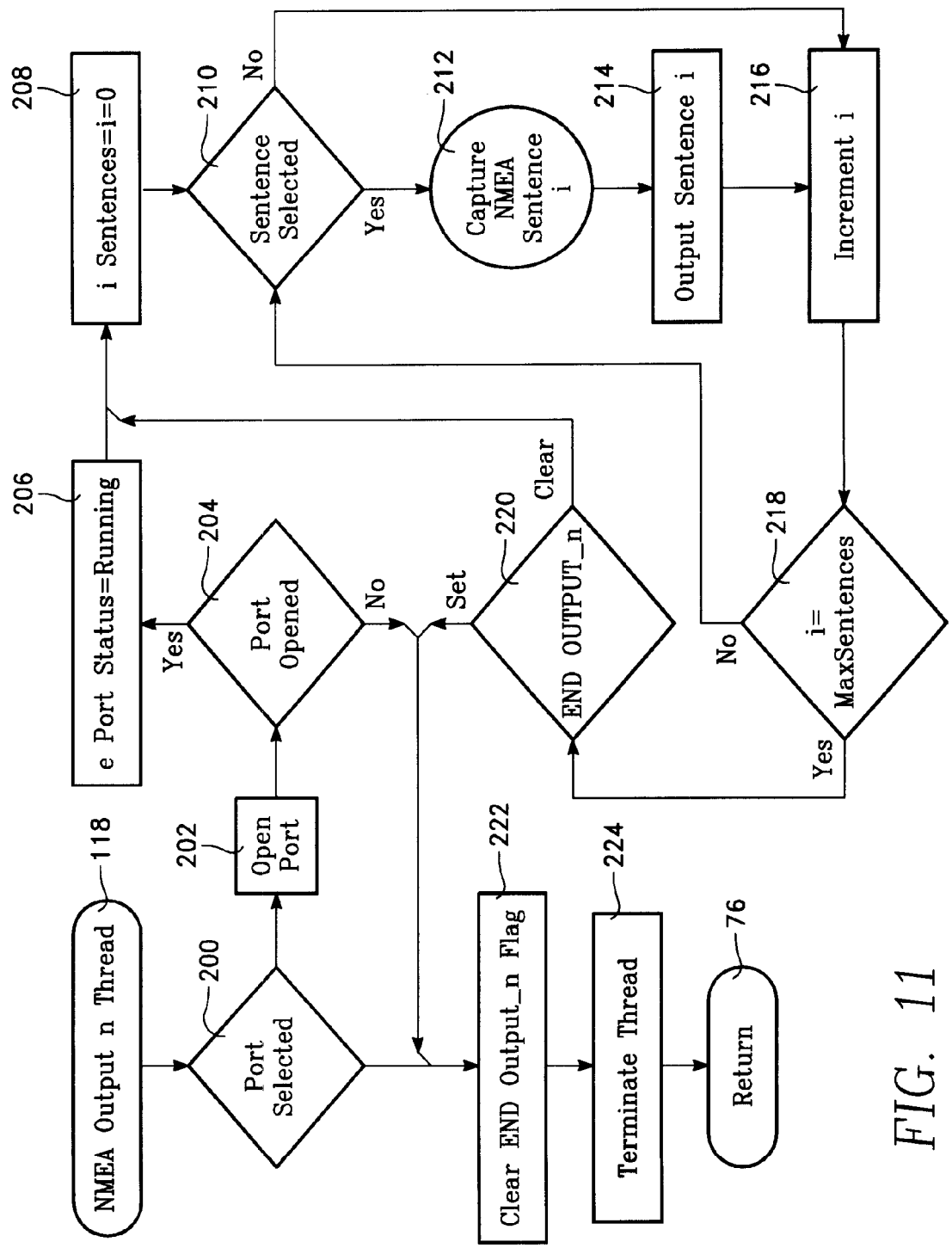
FIG. 11 is the NmeaOutput n Thread for the protocol conversion program used with the inertial navigation unit protocol converter of FIG. 1.
Figure 12:
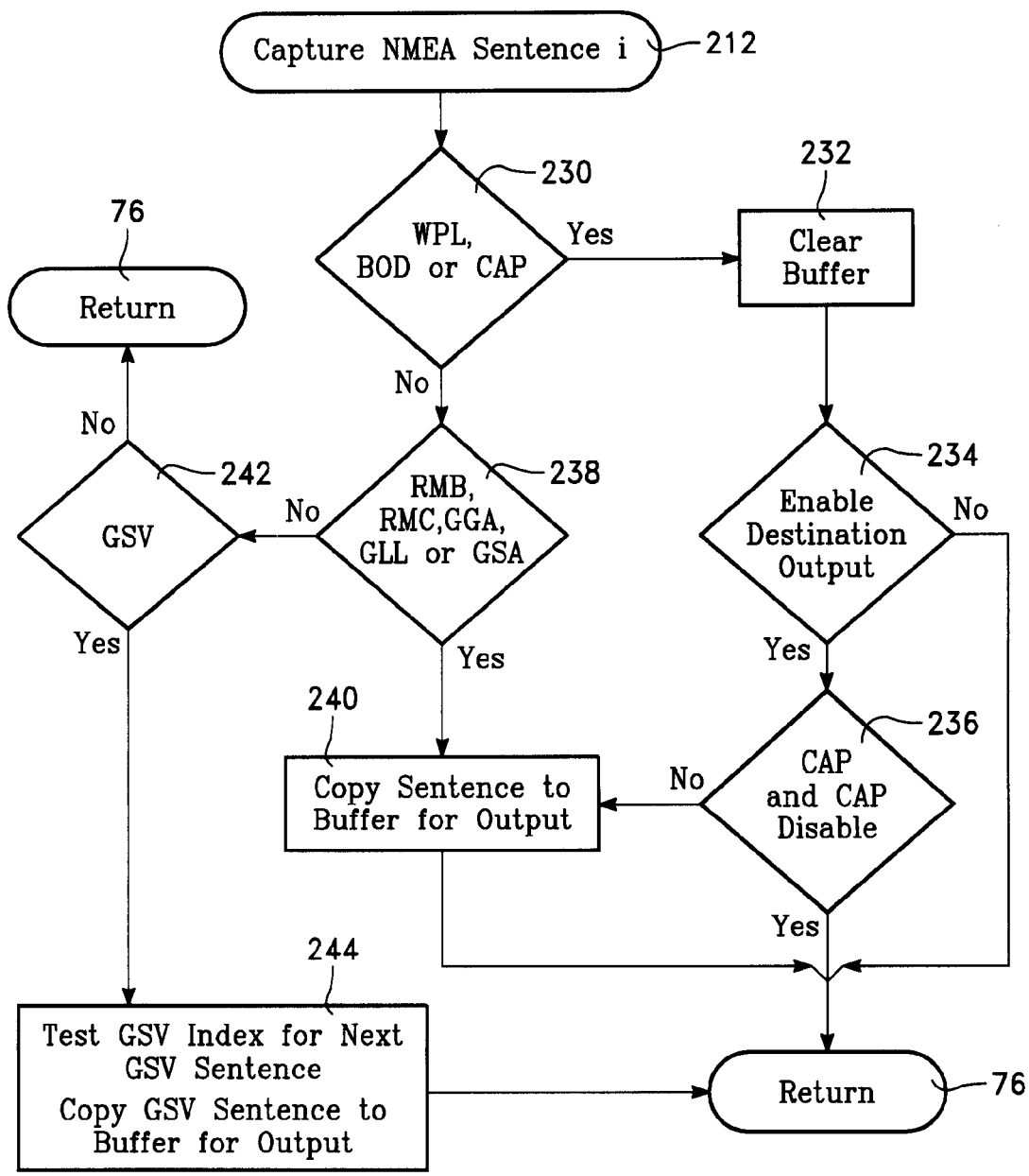
FIG. 12 is the Capture NMEA Sentence i function for the protocol conversion program used with the inertial navigation unit protocol converter of FIG. 1.

Referring to FIGS. 1, 2, 7, 11, and program step 212 starts the CaptureNmeaSentence i routine which is entered through the flow chart of FIG. 11. Program step 230 checks to see if the sentence being processed is the WPL, BOD or CAP sentence. These sentences will be processed only when the "Enable Destination (Waypoint 1) I/O" option 25 is checked in the manner shown in FIG. 2. The buffer which will receive the WPL, BOD or CAP sentence currently being processed is cleared during program step 232. Program step 234 checks to see if the destination output is enabled, i.e. has the "Enable Destination (Waypoint 1) I/O" option of FIG. 2 been checked. When the "Enable Destination (Waypoint 1) I/O" option of FIG. 2 is checked, the software proceeds to program step 236 to determine if the sentence being processed is the CAP sentence and the CAP sentence is disabled.

The software then proceeds to Return (program step 76) when the answer is yes. When the answer is "No" the software proceeds to program step 240 during which the WPL, BOD or CAP sentence is copied to the buffer previously cleared in program step 232. It should be noted that the CAP sentence is copied to the buffer for output only when the sentence is the CAP sentence and the CAP sentence is enabled.

When the sentence to be output is not the WPL, BOD or CAP sentence, the software proceeds to program step 238 to determine if the sentence to be copied is the RMB, RMC, GGA, GLL or a GGA sentence. If the sentence is any one of the five sentences set forth in program step 238, the software proceeds to program step 240. Program step 240 then copies the RMB, RMC, GGA, GLL or a GGA sentence to the buffer for output.

When the sentence is a GSV sentence (program step 242) the software proceeds to program step 244 to test a GSV index. GSV can include as many three sentences having data and the index allows for three GSV sentences having eighty characters. The index is tested for the next GSV sentence to be output and the sentence is copied to the buffer for output.

From the foregoing, it may readily be seen that the present invention comprises a new, unique and exceedingly useful and effective protocol converter for converting ARINC-429 data to NMEA-0183 data which constitutes a considerable improvement over the known prior art. Many modifications and variations of the present inventions are possible in light of the above teachings. It is therefore to be understood that within the scope of the amended the invention may be practiced otherwise than as specifically described.

What is claimed is:

1. A protocol converter for use on board an aircraft comprising:
   a digital computer having an interface board, a data input and a plurality of serial communications ports, said data input of said digital computer receiving ARINC-429 input data from an inertial navigation unit on board said aircraft, wherein said ARINC-429 input data is provided to said interface board within said digital computer;
   said digital computer having a computer software program for operating said digital computer, said digital computer, responsive to said computer software program, reading said ARINC-429 input data from said interface board and then converting said ARINC-429 input data to NMEA-0183 navigation data;
   a display connected to said digital computer to monitor and display said ARINC-429 input data and a status for said ARINC-329 input data, and a configuration and a status for said serial communications ports which output said NMEA-0183 navigation data;
   said digital computer providing said NMEA-0183 navigation data in a sentence format comprising a plurality of NMEA-0183 sentences, wherein an operator selects at least one of said plurality of NMEA-0183 sentences for output via the serial communications ports of said digital computer;

said computer software program constructing each of the plurality of NMEA-0183 sentences selected by said operator for output via the serial communications ports of said digital computer;

said display displaying check marks to indicate the NMEA-0183 sentences selected by said operator for output via the serial communications ports of said digital computer; and said display displaying said ARINC-429 input data for viewing by said operator wherein said ARINC-129 input data includes latitude, longitude, altitude, speed and heading for said aircraft.

2. The protocol converter of claim 1 wherein said plurality of serial communications ports comprises first, second, third and fourth serial communications ports.

3. The protocol converter of claim 2 wherein the operator selects at least one of said first, second, third and fourth serial communications ports to output the NMEA-0183 sentences selected by said operator for output via the serial communications ports of said digital computer.

4. The protocol converter of claim 1 wherein said display displays pitch, and roll for said aircraft and a present time and date.

5. The protocol converter of claim 1 wherein said computer software program has an option for enabling a destination, said display displaying latitude, longitude and altitude data for said destination when said operator selects the option to enable said destination.

6. The protocol converter of claim 1 wherein said display includes four control buttons for use by the operator to control functions performed by said computer software program, wherein said four control buttons include a save button, an OK button, a close button and a cancel button.

7. The protocol converter of claim 6 wherein said save button allows the operator to save changes said operator makes to settings for each of said serial communications ports and to the NMEA-0183 sentences selected by said user for modification.

8. The protocol converter of claim 1 wherein said computer software program comprises an ArincInput thread, an ArincDisplay thread and a NmeaSentence thread which perform data processing and manipulation functions within said computer software program.

9. The protocol converter of claim 8 wherein said ArincInput thread reads the ARINC-429 input data from the interface board within said digital computer and then stores the ARINC-429 input data in an array within said digital computer, said ArincInput thread calculating additional data required by the NMEA-0183 protocol which is not read from the interface board by said ArincInput thread. said ArincInput thread simulating non-available data including satellite data for said plurality of NMEA-0183 sentences.

10. The protocol converter of claim 8 wherein said ArincDisplay thread allows said operator to access and view said display.

11. The protocol converter of claim 8 wherein said NmeaSentence thread constructs each of the NMEA-0183 sentences selected by said operator for output via the serial communications ports of said digital computer.

12. A protocol converter for use on board an aircraft comprising:

a digital computer having an interface board, a data input and first, second, third and fourth serial communications ports, said data input of said digital computer receiving ARINC-429 input data from an inertial navigation unit on board said aircraft, wherein said ARINC-429 input data is provided to said interface board within said digital computer;

said digital computer having a computer software program for operating said digital computer, said digital computer, responsive to said computer software program, reading said ARINC-429 input data from said interface board and then converting said ARINC-429 input data to NMEA-0183 navigation data;

a display connected to said digital computer to monitor and display said ARINC-429 input data and a status for said ARINC-129 input data, and a configuration and a status for said first, second, third and fourth serial communications ports which output said NMEA-0183 navigation data;

said digital computer providing said NMEA-0183 navigation data in a sentence format comprising nine NMEA-0183 sentences, wherein an operator selects at least one of said nine NMEA-0183 sentences for output via the serial communications ports of said digital computer;

said computer software program constructing the NMEA-0183 sentences selected by said operator for output via the serial communications ports of said digital computer;

said display displaying check marks to indicate the NMEA-0183 sentences selected by said operator for output via the serial communications ports of said digital computer; and said display displaying said ARINC-429 input data for viewing by said operator wherein said ARINC-429 input data includes latitude, longitude, altitude, speed, heading, pitch, and roll for said aircraft and a present time and date.

13. The protocol converter of claim 12 wherein said computer software program has an option for enabling a destination, said display displaying latitude, longitude and altitude data for said destination when said operator selects the option to enable said destination.

14. The protocol converter of claim 12 wherein said display includes four control buttons for use by the operator to control functions performed by said computer software program. wherein said four control buttons include a save button, an OK button, a close button and a cancel button.

15. The protocol converter of claim 14 wherein said save button allows the operator to save changes said operator makes to settings for each of said serial communications ports and to the NMEA-0183 sentences selected by said user for modification.

16. A protocol converter for use on board an aircraft comprising:

a digital computer having an interface board, a data input and first, second, third and fourth serial communications ports, said data input of said digital computer receiving ARINC-429 input data from an inertial navigation unit on board said aircraft, wherein said ARINC-429 input data is provided to said interface board within said digital computer;

said digital computer having a computer software program for operating said digital computer, said digital computer, responsive to said computer software program, reading said ARINC-429 input data from said interface board and then converting said ARINC-429 input data to NMEA-0183 navigation data;

a display connected to said digital computer to monitor and display said ARINC-429 input data and a status for said ARINC-429 input data, and a configuration and a status for said first, second, third and fourth serial communications ports which output said NMEA-0183 navigation data;

said digital computer providing said NMEA-0183 navigation data in a sentence format comprising nine NMEA-0183 sentences, wherein an operator selects at least one of said nine NMEA-0183 sentences for output via the serial communications ports of said digital computer;

said computer software program constructing the NMEA-0183 sentences selected by said operator for output via the serial communications ports of said digital computer;

said display displaying check marks to indicate the NMEA-0183 sentences selected by said operator for output via the serial communications ports of said digital computer;

said display displaying said ARINC-429 input data for viewing by said operator wherein said ARINC-429 input data includes latitude, longitude, altitude, speed, heading, pitch, and roll for said aircraft and a present time and date; and said computer software program including an ArincInput thread, an ArincDisplay thread and a NmeaSentence thread which perform data processing and manipulation functions within said computer software program;

said ArincInput thread reading the ARINC-429 input data from the interface board within said digital computer and then stores the ARINC-429 input data in an array within said digital computer, said ArincInput thread calculating additional data required by the NMEA-0183 protocol which is not read from the interface board by said ArincInput thread said ArincInput thread simulating non-available data including satellite data for said nine NMEA-0183 sentences;

said ArincDisplay thread allowing said operator to access and view said display; and said NmeaSentence thread constructs each of the NMEA-0183 sentences selected by said operator for output via the first, second, third and fourth serial communications ports of said digital computer.

17. The protocol converter of claim 16 wherein said computer software program has an option for enabling a destination, said display displaying latitude, longitude and altitude data for said destination when said operator selects the option to enable said destination.

18. The protocol converter of claim 16 wherein said display includes four control buttons for use by the operator to control functions performed by said computer software program, wherein said four control buttons include a save button, an OK button, a close button and a cancel button.

19. The protocol converter of claim 18 wherein said save button allows the operator to save changes said operator makes to settings for each of said serial communications ports and to the NMEA-0183 sentences selected by said user for modification.

20. The protocol converter of claim 18 wherein said close button allows the operator to terminate said computer software program including said ArincInput thread, said ArincDisplay thread and said NmeaSentence thread.

* * * * *